(12) United States Patent
Davey et al.

(10) Patent No.: US 6,644,097 B2
(45) Date of Patent: Nov. 11, 2003

(54) METHOD AND APPARATUS FOR INFERRING FUEL MIXTURE

(75) Inventors: Christopher Kirk Davey, Novi, MI (US); David Robert Nader, Farmington Hills, MI (US); Jeffrey Scott Hepburn, Dearborn, MI (US); Michael Igor Kluzner, Oak Park, MI (US); Robert Joseph Jerger, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 10/208,532

(22) Filed: Jul. 30, 2002

(65) Prior Publication Data

US 2002/0189333 A1 Dec. 19, 2002

Related U.S. Application Data

(63) Continuation of application No. 09/293,899, filed on Apr. 19, 1999.

(51) Int. Cl.[7] ............................................. G01N 33/497
(52) U.S. Cl. ........................................................ 73/23.32
(58) Field of Search ............................ 73/23.31, 23.32, 73/35.01, 35.02; 204/424–429

(56) References Cited

U.S. PATENT DOCUMENTS

| 4,402,212 A | * | 9/1983 | Childs .......................... 73/35 |
| 4,825,838 A | * | 5/1989 | Osuga et al. ................ 123/489 |
| 4,986,241 A | * | 1/1991 | Inoue et al. ................. 123/479 |
| 5,400,762 A | * | 3/1995 | Fodale et al. ............... 123/690 |

* cited by examiner

*Primary Examiner*—Edward Lefkowitz
*Assistant Examiner*—Maurice Stevens
(74) *Attorney, Agent, or Firm*—Allan J. Lippa; Kolisch, Hartwell, P.C.

(57) ABSTRACT

A method of determining the type of fuel being burned in an engine by analyzing the signal provided by a exhaust gas oxygen sensor signal is disclosed. The determination is based on the ratio of the value of certain characteristics of the signal during the lean and rich portions of the signal.

7 Claims, 5 Drawing Sheets

METHOD AND APPARATUS FOR INFERRING FUEL MIXTURE

This is a continuation of patent application Ser. No. 09/293,899, filed Apr. 19, 1999, titled "METHOD AND APPARATUS FOR INFERRING FUEL MIXTURE", assigned to the same assignee as the present application, and which is incorported by reference herein in its entirety.

TECHNICAL FIELD

This invention relates generally to electronic control of automotive engines and, more particularly, to a method and apparatus for inferring fuel mixture based on the processing of exhaust gas sensor data.

BACKGROUND OF THE INVENTION

The combustion of air/fuel mixtures in internal combustion engines, such as those found in automobiles, produces an exhaust gas stream comprised of various gaseous components, such as hydrocarbons (HC), carbon monoxide (CO), and oxides of nitrogen ($NO_x$). Those skilled in the art will appreciate that oxides of nitrogen refers to both NO and $NO_2$.

Attempts to eliminate or control these components have involved the use of three-way catalysts (TWC). Such catalysts typically oxidize HC and CO, while simultaneously reducing NOx. However, optimizing both the oxidation of HC and CO and the simultaneous reduction of NOx requires close control of the air/fuel (A/F) ratio entering the internal combustion engine. Optimum reduction of all three components occurs when the A/F ratio is close to stoichiometric or $\lambda=1$, i.e., 14.65 kilograms of air to 1 kilogram of gasoline for a commonly used fuel. It will be appreciated that $\lambda$ is the excess air/fuel factor and is defined by dividing the quantity of air and fuel actually supplied by the theoretical stoichiometric air/fuel requirement.

In order to achieve and maintain the desired A/F ratio, exhaust gas oxygen (EGO) sensors and closed-loop control circuits have been used in conjunction with three-way catalysts. Such emission control systems generally measure the oxygen concentration of the exhaust gas and adjust the relative amounts of air and fuel supplied to the engine in response thereto. EGO sensors provide a feedback adjustment whenever the air/fuel ratio is other than a predetermined level, i.e., $\lambda=1$, to indicate whether the mixture is richer ($\lambda<1$) or leaner ($\lambda>1$) than $\lambda=1$. This level is known as the closed loop control point and, within narrow limits, may be selected as desired, i.e., other than $\lambda=1$.

Electronic engine control systems operate in a variety of modes depending on engine conditions, such as starting, rapid acceleration, sudden deceleration, and idle. Under closed-loop control, the amount of fuel delivered is determined primarily by the concentration of oxygen in the exhaust gas, the concentration of oxygen in the exhaust gas being indicative of the ratio of air and fuel that has been ignited.

Engines which are capable of operating on different fuels, such as gasoline, methanol, or a. mixture of the two, utilize electronic engine control systems to change the engine operating parameters in response to the type of fuel being delivered to the engine. Such systems utilize a sensor to detect the type of fuel being delivered to the engine and an electronic engine controller to vary the operating parameters accordingly. An instance of such a system is disclosed in Curran et al. in U.S. Pat. No. 5,230,322. A drawback to such systems is the cost of the flexible fuel sensor. Furthermore, in the event that the flexible fuel sensor fails, the operating parameters which are dependent on the output of the fuel type sensor will be erroneous.

SUMMARY OF THE INVENTION

The present invention proposes a method of determining whether the fuel being used is gasoline or an alternative type of fuel such as ethanol and avoids the need for a fuel type sensor. The determination of fuel type, in accordance with the present invention, is based on analyzing the signal from the exhaust gas oxygen (EGO) sensor. As previously stated, an EGO sensor is normally provided in the fuel control system of the vehicle for monitoring the oxygen content of the exhaust gas in order to permit the air/fuel ratio to be changed as necessary to maintain a stoichiometric value. Thus, the cost of identifying the fuel type as proposed by the present invention, is substantially reduced. In accordance with the present invention, the determination of fuel type is based on the ratio of the value of certain characteristics of the signal during the rich and lean portions of the signal. One such characteristic is the area of the rich and lean portions of the signal waveform. Other characteristics such as signal length or period may also be used instead of or in combination with the area.

BRIEF DESCRIPTION OF THE DRAWINGS

These and other features and advantages of the present invention will become more apparent from the following detailed description of the invention which should be read in conjunction with the drawings in which.

DETAILED DESCRIPTION OF PREFERRED EMBODIMENT

Figure 1:
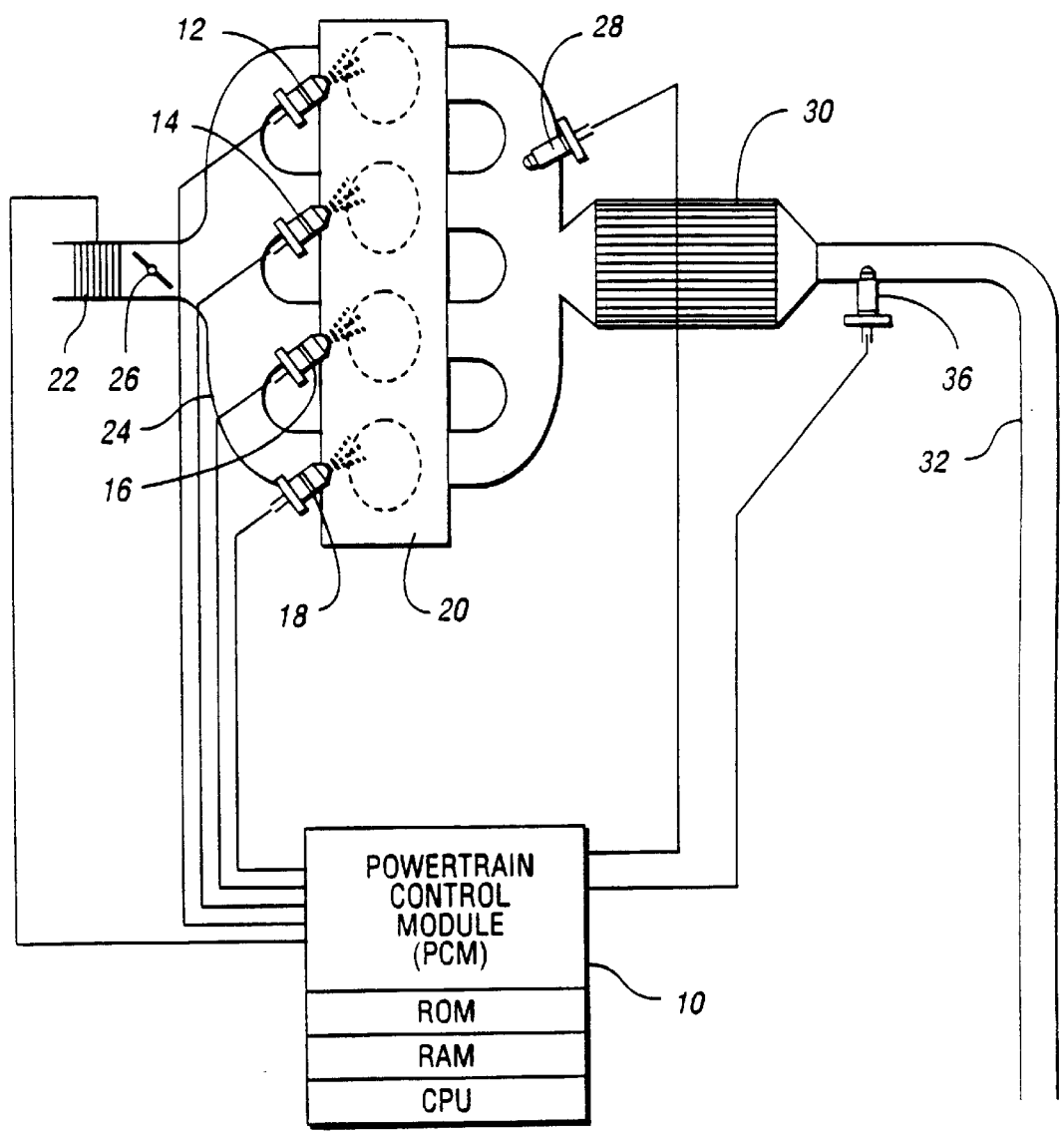
FIG. 1 is a diagram of an engine control system that embodies the principles of the invention.

Referring now to the drawings, and initially to FIG. 1, a powertrain control module (PCM) generally designated 10 is an electronic engine controller including ROM, RAM and CPU as indicated. The PCM controls a set of injectors 12, 14, 16 and 18 which inject fuel into a four-cylinder internal combustion engine 20. Fuel is conventionally supplied to the injectors from a fuel tank (not shown). The fuel injectors are of conventional design and are positioned to inject fuel into their associated cylinder in precise quantities as determined by the controller 10. The controller 10 transmits a fuel injector signal to the injectors to maintain an air/fuel ratio determined by the controller 10. An air meter or air mass flow sensor 22 is positioned at the air intake of the manifold 24 of the engine and provides a signal regarding air mass flow resulting from positioning of the throttle 26. The air flow signal is utilized by controller 10 to calculate an air mass (AM) value which is indicative of a mass of air flowing into the induction system in lbs./min. A heated exhaust gas oxygen (HEGO) sensor 28 detects the oxygen content of the exhaust gas generated by the engine, and transmits a signal to the controller 10. Sensor 28 is used for control of the engine A/F, especially during any stoichiometric operation.

An exhaust system, comprising one or more exhaust pipes, transports exhaust gas produced from combustion of an air/fuel mixture in the engine to a conventional close-coupled, three-way catalytic converter (TWC) 30. The converter 30 contains a catalyst material that chemically alters exhaust gas that is produced by the engine to generate a catalyzed exhaust gas. The catalyzed exhaust gas is fed through an exhaust pipe 32 to the atmosphere.

An oxygen sensor 34 is located downstream from the TWC 30 and is used to monitor the HC efficiency of the TWC 30 using the well-understood method of comparing the signal amplitude of sensor 34 with that of sensor 28 during conventional stoichiometric closed-loop limit cycle operation. Still other sensors, not shown, provide additional information about engine performance to the controller 10, such as camshaft position, crankshaft position, angular velocity, throttle position, air temperature, etc. The information from these sensors is used by the controller to control engine operation.

Figure 2:
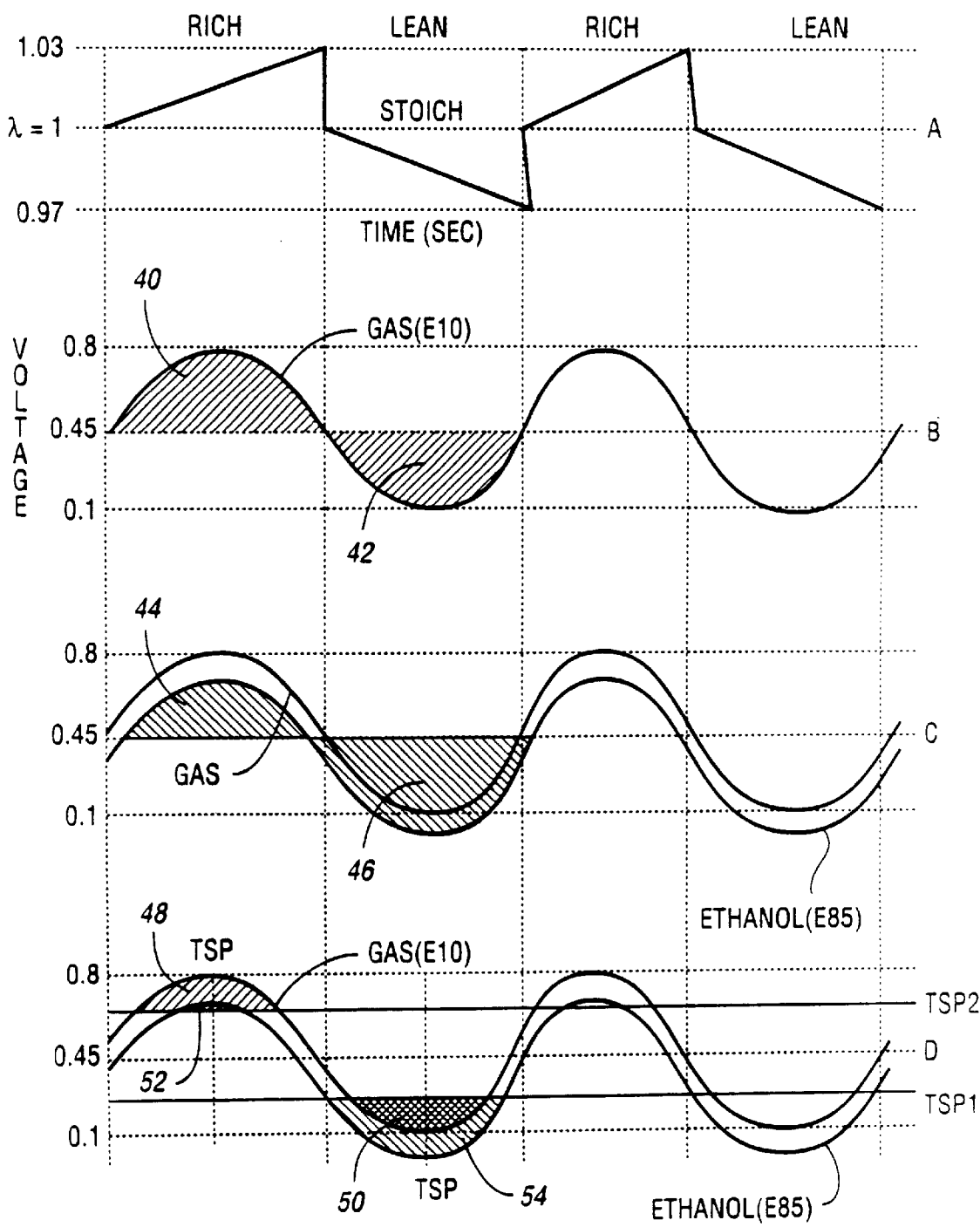
FIGS. 2 and 3 depict waveforms of the output of a heated exhaust gas oxygen sensor and controller generated A/F.

Referring now to FIGS. 2A-2D, Lambse or air/fuel ratio (A/F) is controlled with respect to time about a stoichiometric value as shown in FIG. 2A. The A/F signal is generated by a proportional-integral (PI) controller in the module 10. The PI controller responds to the output voltage of sensor 28 to modify the amount of fuel supplied to the engine to maintain operation about stoichiometry as indicated in FIG. 2A. The voltage output of the HEGO sensor 28 with respect to time is shown in FIGS. 2B-2D. As shown in FIG. 2B, the output of the sensor is substantially symmetrical about a voltage value of 0.45 volts when the engine is being supplied with 90% gasoline and 10% ethanol, hereinafter referred to as gasoline fuel mixture (GAS). As the fuel mixture ethanol content increases, a lean shift in the sensor waveform occurs. As shown in FIGS. 2C and 2D, the sensor signal waveform (ETHANOL) corresponding to closed loop combustion of an ethanol fuel mixture, for example 85% ethanol and 10% gasoline, displays a significant shift toward lean operation with respect to gasoline operation. Also there is a time constant change due to the different ethanol fuel chemistry. In accordance with the present invention, the lean to rich ratio of one or more characteristics of the sensor output is used to infer the fuel mixture content.

One embodiment of the present invention relies on the change in the ratio of the area of the lean to the rich cycles of the sensor waveform to detect a change in the type of fuel being supplied to the engine. When gasoline is being used, the lean and rich cycles of the sensor waveform, designated 40 and 42, respectively, are essentially the same and the area ratio is equal to 1. When the engine is supplied with ethanol, the area under the rich portion, indicated at 44, of the sensor waveform is less than that under the lean portion, indicated at 46, of the waveform as shown in FIG. 2C, and accordingly the ratio of the lean to the rich area is greater than 1. A determination of fuel type is made by the controller 10 based on whether the lean to rich area ratio exceed a threshold value of 1 and is thus indicative of exhaust generated from the burning of ethanol fuel. The equation that is implemented by the controller 10, for determining the ratio of the area of the lean to rich portions of a single cycle may be expressed as:

$$\frac{(\sum dV \times dt)\text{Lean}}{(\sum dV \times dt)\text{Rich}}$$

where V is the sensor voltage and t is time. Preferably, a running average of the ratio is determined over a number of cycle.

While a determination of area can be made with respect to the 0.45V line, representing stochiometric operation, the area ratio approach may also be applied with respect to the Tracking Switch Points (TSP1 and TSP2 ) shown in FIG. 2D. In the TSP technique the area under the curve defined by predetermined rich and lean reference voltage levels of, for example, 0.65V and 0.21V, respectively, are used in determining the area ratio of the lean to rich portions of the cycle. The TSP approach provides greater accuracy but requires more computer resources and, therefore, may be confined to times when the sensor has shown signs of aging as discussed below. FIG. 2D shows that the areas 48 and 50 defined by the intersection of the waveform with the TSP1 and TSP2 levels, respectively, are substantially equal for usage of GAS, while the area of the rich portion 52 of the cycle is less than the area of the lean portion 54 of the cycle for use of ETHANOL. Thus, the lean to rich area ratio would also be greater than 1 for ETHANOL when the TSP technique is used.

Figure 3:
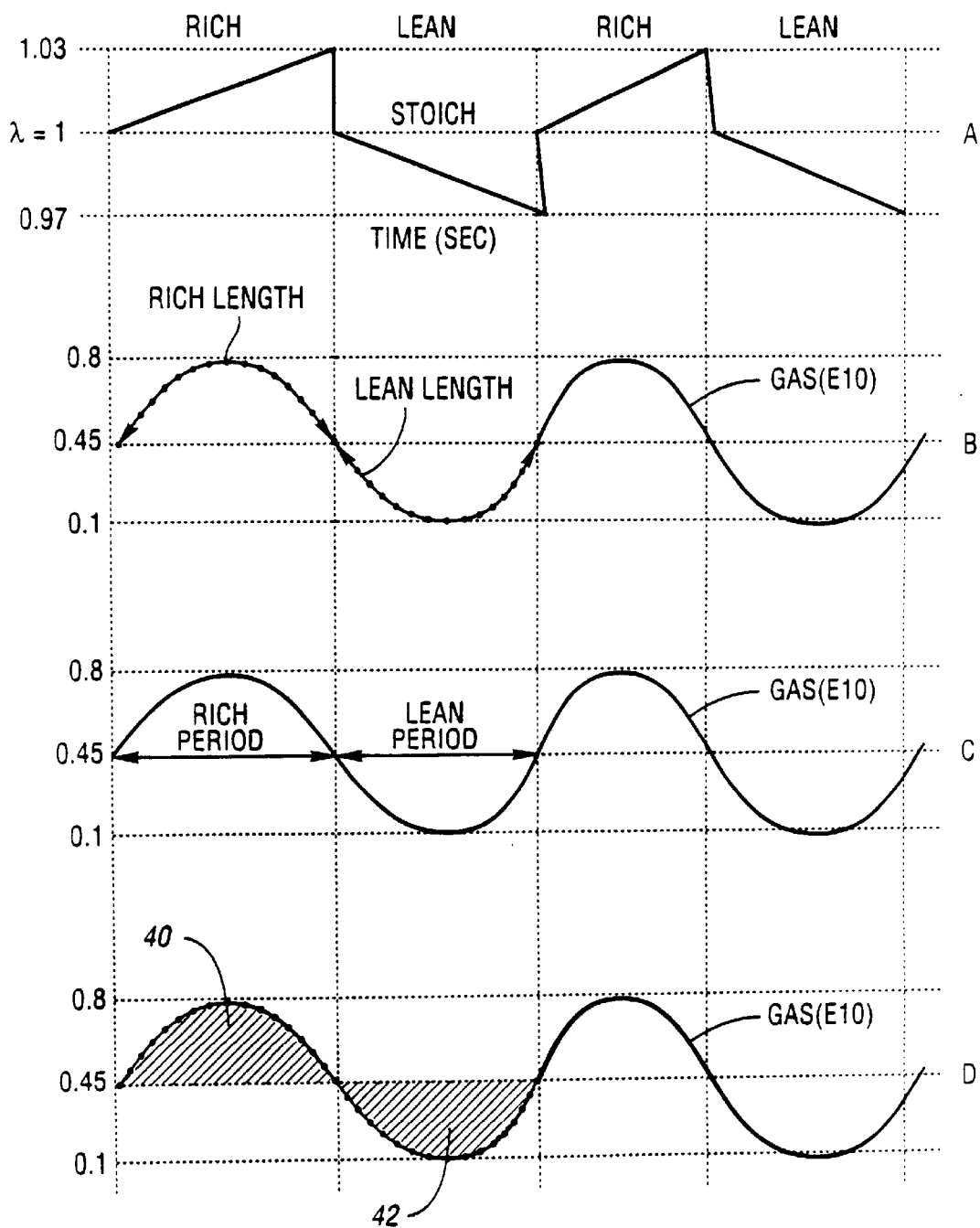

Other characteristics such as signal length or period may also be used instead of or in combination with the area. It will be noted in FIG. 3B, that the length of the voltage waveform during slightly lean operation, using GAS, is substantially equal to the length of the voltage waveform during the slightly rich operation. The equation that is implemented by the controller 10, for determining the ratio of the length of the lean to rich portions of a single cycle may be expressed as:

$$\frac{\{\sum \sqrt{dv^2 \times dt^2}\}\text{Lean}}{\{\sum \sqrt{dv^2 \times dt^2}\}\text{Rich}}$$

It will be understood by observing the ETHANOL waveform of FIG. 2C, that the length of the lean portion will be greater than that of the rich portion, producing a ratio of greater than 1 when ethanol is being used.

As shown in FIG. 3C, the period or time interval of the rich and lean portions of the symmetrical voltage versus time waveform, produced when gasoline is being used, are substantially the same. However, as shown in the ethanol waveform of FIG. 2C, the time interval of the lean portion of the ethanol waveform is greater than that for the rich portion. Thus, the ratio of the lean to rich time interval provides another metric for determining the type of fuel being used.

With reference to FIG. 3D, another metric for determining the type of fuel being used is shown. Here, the ratio of length to area of the lean portion of the waveform is compared with or divided by the ratio of the length to area of the rich portion of the waveform. Because of the symmetry of the waveform when gasoline is being used, this ratio will be approximately 1. However, as shown in FIG. 2C, the length and the area of the lean portion will be greater than the length and the area of the rich portion when ethanol is being used and the ratio will be greater than 1. The TSP approach described in FIG. 2D may also be used with respect to the methods shown in FIGS. 3B-3D. In using TSP with the approach of FIG. 3C, the time interval between the intersection of the waveform with the TSP1 and TSP2 reference levels is measured.

Figure 4:
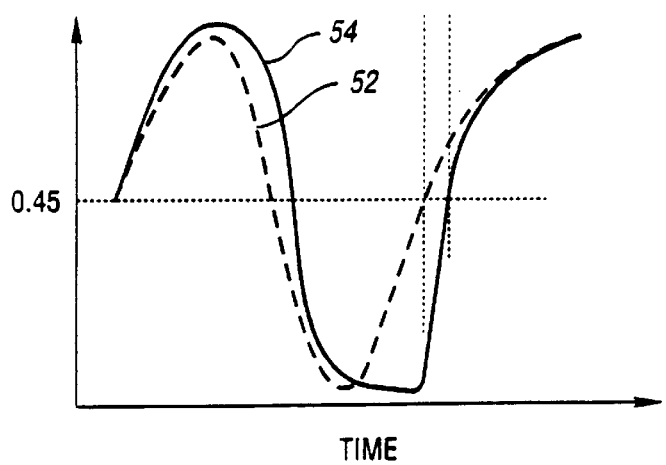
FIG. 4 compares the signal output of a new with an aged oxygen sensor.
Figure 5:
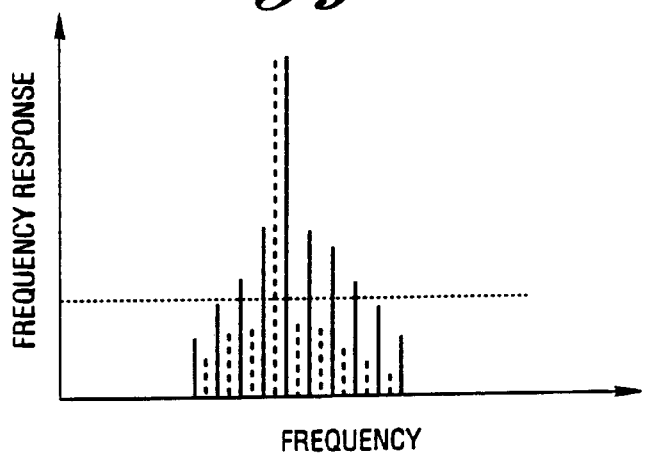
FIG. 5 shows the frequency response of a new and an aged oxygen sensor.
Figure 6:
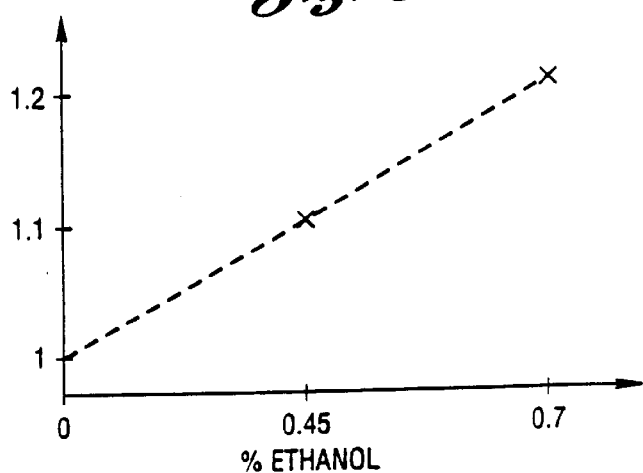
FIG. 6 is a plot of the percentage of ethanol as a function of area ratio.

The accuracy of the ratio calculated in any of the aforementioned methods will be affected as the sensor ages to the point of providing erroneous data. As indicated in FIG. 4, the voltage vs. time waveform of a new sensor is shown at 52. The waveform becomes distorted, as indicated at 54, with aging of the sensor. A Fast Fourier Transform analysis of the sensor output signal may be employed to detect the aging of the sensor. The frequency components of the sensor output is shown in FIG. 5 which compares the response of a new sensor (dotted) with an aged sensor (solid). FIG. 6 shows that the area ratio is substantially proportional to the percentage of ethanol in the fuel. Thus, when the fuel tank contains a transitional mixture between GAS and ETHANOL, this proportional relationship may be used to more accurately identify the fuel mixture.

Figure 7:
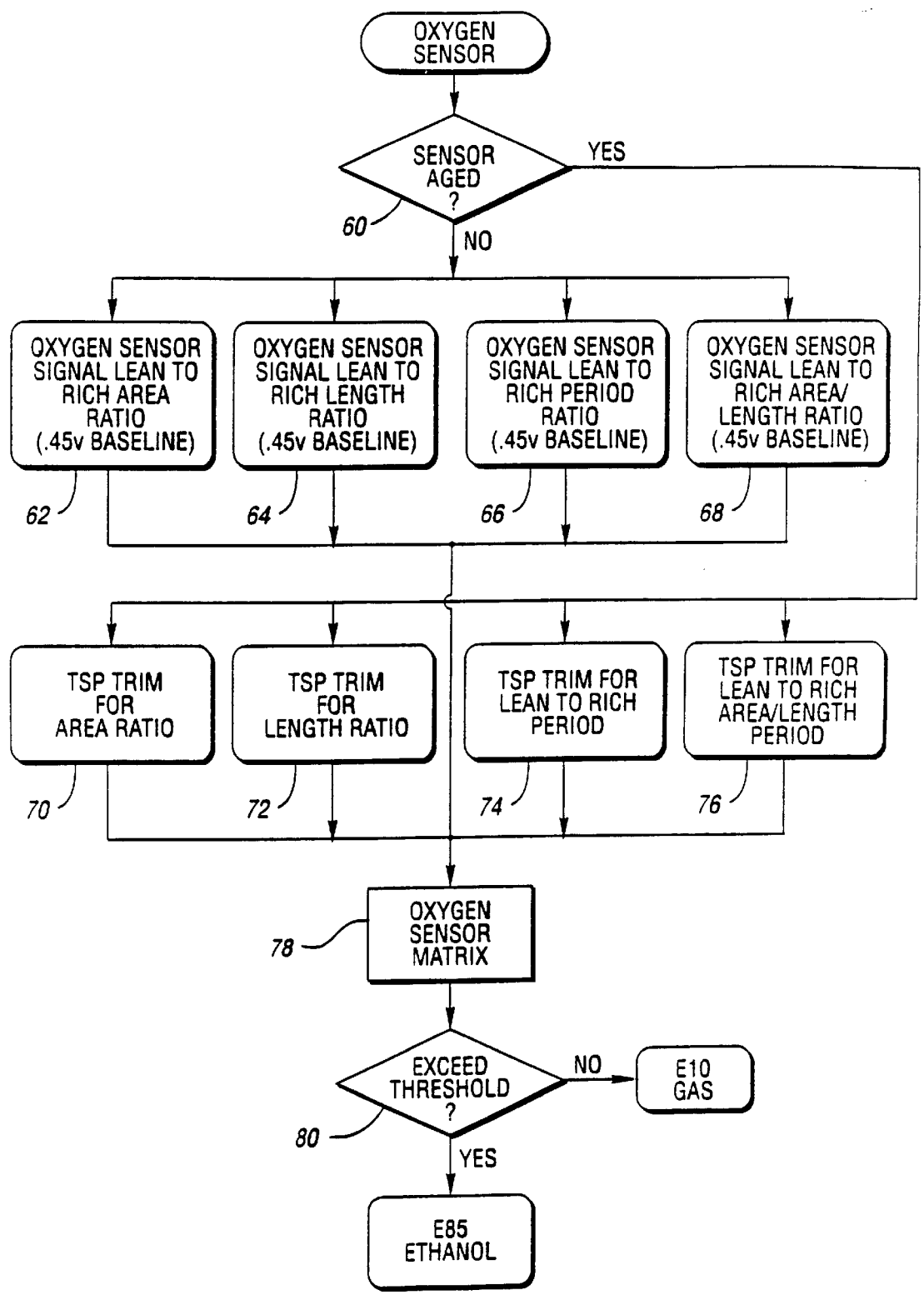
FIG. 7 is a flowchart of the program for carrying out the invention.

Referring now to FIG. 7, a flowchart of the program for implementing the invention includes a decision block 60 for testing the frequency response of the oxygen sensor to determined whether the sensor has aged beyond a predetermined condition. If not, then sensor data is analyzed using the four metrics discussed in FIG. 2C and FIGS. 3B-3D, as indicated in blocks 62-68, respectively. If the sensor has aged beyond a predetermined limit, the sensor data is analyzed using the TSP approach discussed in FIG. 3 as applied to all four metrics as indicated in the blocks 70-76. The outputs of the blocks 62-68 or the outputs of the blocks 70-76 are fed to an oxygen sensor matrix block 78 which applies predetermined weight factors to each of the output. The individual weights are determined through experiment. In decision block 80, the combined matrix outputs are compared with a predetermined threshold to determine whether the fuel is GAS or ETHANOL.

While the best mode for carrying out the present invention has been described in detail, those familiar with the art to which this invention relates will recognize various alternative designs and embodiments for practicing the invention as defined by the following claims.

What is claimed is:

1. A method of determining the type of fuel being burned in an engine of a vehicle having an exhaust gas oxygen sensor located in the engine exhaust path, said sensor producing an output signal of varying voltage over time and having rich and lean portions, comprising the steps of:

analyzing said output signal to determine values of at least one characteristic of the rich and lean portions respectively of said output signal;

calculating a ratio of said values; and making a fuel type determination based on said ratio.

2. The method of claim 1, comprising the further step of determining whether the sensor has aged beyond a predetermined limit before making said fuel type determination.

3. The method of claim 2, wherein said age determination is based on the fast fourier transform of said output signal.

4. The method of claim 1, wherein said at least one characteristic is the area of said portions of said output signal.

5. The method of claim 1, wherein said at least one characteristic is signal length of said output signal during said portions respectively.

6. The method of claim 1, wherein said at least one characteristic is signal period of said output signal during said portions respectively.

7. The method of claim 1, wherein one characteristic of the output signal is signal length and another characteristic of the output signal is area and wherein the ratio calculated is the ratio of the length to the area of one of the rich or lean portions divided by the ratio of the length to the area of the other of the rich or lean portions.

* * * * *